Feb. 16, 1971   S. P. COOK   3,563,743
PROCESS FOR PREPARING REFLECTION REPLICA USED
IN OPTICAL PROCESSING SYSTEM
Filed June 28, 1967

INVENTOR:
SAM P. COOK
BY: *Theodore E. Biber*
HIS ATTORNEY

United States Patent Office 3,563,743
Patented Feb. 16, 1971

3,563,743
PROCESS FOR PREPARING REFLECTION REPLICA USED IN OPTICAL PROCESSING SYSTEM
Sam P. Cook, Bellaire, Tex., assignor to Shell Oil Company, New York, N.Y., a corporation of Delaware
Filed June 28, 1967, Ser. No. 649,532
Int. Cl. G03f 5/00, 7/24; G02b 1/10
U.S. Cl. 96—38
5 Claims

ABSTRACT OF THE DISCLOSURE

A process for improving the quality of the reflection repilca used in the optical data processing system described in the copending application of S. P. Cook, Serial No. 451,795, now Patent No. 3,438,693. The improved reflection replica is obtained by coating a flat reflective surface with a photosensitive plastic material and then exposing the coated surface to light that passes through both a transparent display of the information-containing pattern and a light-diffusing screen, such as a halftone screen. The photosensitive coating is then developed so that the portion of the photosensitive coating that remains is permeated by the irregularities corresponding to the pattern of the screen.

BACKGROUND OF THE INVENTION

Figure 1:
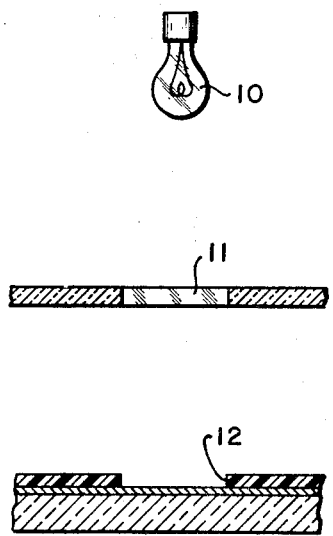

In the above-referenced copending application there is described an optical data processing system of the type in which the well-known phenomena of Fraunhofer diffraction is utilized to produce essentially a two-dimensional Fourier transform of the spatial structure of the diffracting object. The system is described with specific reference to the use of seismic sections as the diffracting object. In principle, the Fraunhofer diffraction pattern is a diffraction pattern produced at an infinite distance by an object illuminated by a source of coherent light, also infinitely distant. In practice, the two-dimensional Fraunhofer diffraction pattern can be found along the focal plane of an imaging lens or mirror placed in the path of the diffracted light and the illumination may be obtained from a point source located at a finite distance with the source rays being collimated by a collimating lens or mirror. Less complexity can be achieved in the resulting diffraction pattern by using monochromatic light, although acceptable results can be obtained by using an intense light source whose output is filtered to restrict the wave length to a narrow band of frequencies.

The copending application is directed to an improved optical data processing system in which reflection optics are used in place of transmission optics of prior art systems. The use of reflection optics reduces the overall light losses, since fewer surfaces are involved, and thus decreases the loss of contrast in the final images caused by spurious reflections. The copending application replaces the film record of the prior-art system with a reflection replica comprising an optically flat reflective surface having a relief image or facsimile of the seismic record replicated thereon. The reflection replica is preferably produced by a photographic process utilizing either a silver halide sensitized emulsion or a photosensitive plastic, such as Kodak Photoresist. Photosensitive plastics are preferred, since by their use relief images are produced which after processing result in a reflective surface having a surface flatness as good as the original reflective surface. The reflection replica of the seismic section is positioned to be illuminated by a light source of spatially coherent light that is collimated by a collimating mirror. The light diffracted by the reflection replica is collected and focused by means of an imaging mirror to form the Fraunhofer diffraction pattern or Fourier transform of the spatial structure of the facsimile. Appropriate filters are interposed in the optical path between the replica of the seismic section and the reimaged seismic section. The filters correspond to harmonic filtering in conventional seismic terminology.

In the system of the copending application the reflection replica is formed by first coating with a photosensitive plastic an optical flat that has previously been chromium plated. The seismic section is then contact printed on the coated optical flat. The exposed optical flat is then processed or developed to produce a replica containing the seismic section in relief with the reflective portions of the blank exposed. The remaining photosensitive coating pattern is then dyed to render it essentially nonreflective. While the system of the copending application has solved many of the problems of the prior-art transmission-optic systems, one problem is still present.

The remanent photosensitive coating cannot be made completely nonreflective. Small residual reflectivity does not interfere with the filtering in the Fourier plane, since its diffraction will have the same pattern as the reflective portion of the replica, but it does decrease the contrast in the reconstructed image. The decrease in contrast results from some of the light now being directed into regions which were intended to be dark.

SUMMARY OF THE INVENTION

The present invention solves the above problem by providing a reflection replica in which the portion of the plastic which remains on the reflection replica is permeated with irregularities that correspond to a selected pattern. More particularly, the pattern is selected so that the light diffracted from the irregularities is outside of the filter aperature disposed in the Fourier plane. Such a pattern can be produced using a diffusing screen. In the case of seismic sections it has been determined that irregularities produced by a halftone screen having 26.7 lines per millimeter or more will satisfy the above condition. The pattern of irregularities may be generated by different systems for diffracting light, one such system being the exposing of the coated reflecting surfaces to the light that passes through a halftone screen having at least 26.7 lines per millimeter. The exposing of the coating to the light that passes through the halftone screen may be done at the same time that the coating is exposed to the light that passes through the original transparency of the seismic section, or may be a separate step.

The permeating of the remaining coated surface with a pattern of irregularities causes the coherent light rays to be diffracted outside the range of the filter that is disposed in the Fourier plane. Thus, the remaining light is not diminished by the reflections from the remaining coated areas, and the overall contrast of the seismic section is improved.

BRIEF DRESCRIPTION OF THE DRAWINGS

Figure 2:
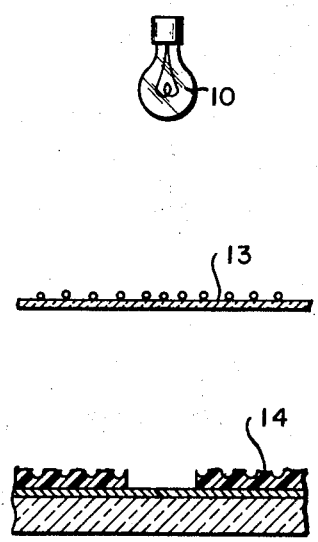
Figure 3:
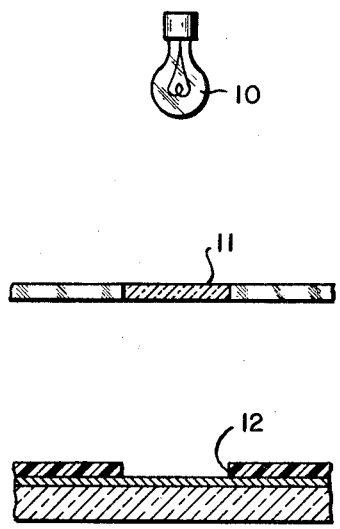
Figure 4:
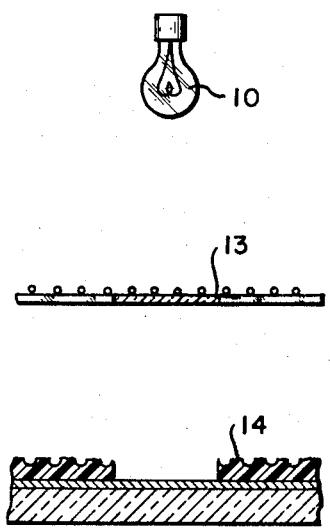

The above objects and advantages of this invention will be more easily understood from the following detailed description of a preferred embodiment when taken with the accompanying drawings in which FIG. 1 is a schematic view of the exposing of the coated surface to the light that passes a transparency of the seismic section;

FIG. 2 is the continuation of FIG. 1 wherein the coated reflective replica is exposed to light that passes the halftone screen; and FIGS. 3 and 4 are similar to FIGS. 1 and 2, but show the use of the invention with a negative film coating in place of the positive coating shown in FIGS. 1 and 2.

Description of preferred embodiments

Referring now to FIGS. 1 and 2, the steps of the process of this invention are shown in schematic form. More particularly, the process comprises first coating a reflective base member with a positive photosensitive coating. The reflective base member must be optically flat and preferably is an optically flat glass base. The base member may be made rebective by coating it with various materials, for example, a thin chromium reflective layer. A positive photosensitive coating is then deposited on the reflective chromium layer. As explained above, the photosensitive coating is preferably a plastic material, for example, Kodak Photoresist manufactured by the Kodak Company of Rochester, N.Y. The steps of depositing photosensitive coatings onto base materials are well known to those skilled in the photographic arts as well as those skilled in the processing of seismic records. Thus, no further explanation will be included.

After the coated reflective base member has been prepared, it is exposed to the light that passes through an information transparency. In the case of seismic records the transparency will be a replica of the signals related to the original seismic section recorded either in the form of a variable-area or a variable-density record. Again, the recording of variable-area and variable-density records on photographic transparencies is well known to those skilled in the seismic art. The information transparency may be transferred to the coated reflective member by suitable means, for example, an ordinary contact print may be made. This is illustrated diagrammatically in FIG. 1 by means of a light 10 which shines through a transparent portion of the seismic transparency 11 and exposes an area 12 of the coating on the reflective base member. As actually shown in FIG. 1 the exposed area has been removed by developing the coated reflective base member in a suitable developing solution. The developing solution will dissolve away the coating in an exposed area and leave the unexposed areas intact. The development is shown as actually having taken place, but it is obvious that only a single development step is required after the coated reflective base member has been exposed to both the light that passes the information transparency and the light that passes the halftone screen.

Referring now to FIG. 2 there is shown a halftone screen 13 disposed between the light source 10 and the coated reflective member. The coated reflective base member is lightly exposed to the light that passes the halftone screen and after development the upper surface 14 of the sensitive coating will be permeated by irregularities corresponding to the pattern of the halftone screen. Again the member is shown in FIG. 2 in the developed condition and not the originally exposed condition. After development the remaining areas of the coating on the reflective base member are covered with a nonreflective coating or surface, for example the coated areas may be covered with a dull black pigmented coating.

As explained above, the halftone screen should have a fineness of approximately 26.7 lines per millimeter to insure that the frequencies generated by the light diffracting from the coated areas falls outside of the mask that is disposed in the Fourier plane of the processing equipment. The use of the reflection replica in optical data processing is completely described in the above-reference copending application and is not repeated here.

Referring now to FIGS. 3 and 4 there is shown schematically the operation of the invention using a negative photosensitive coating. The steps in preparing the reflection replica are the same as those described above with respect to FIGS. 1 and 2. These steps consist of first coating an optically flat base member with a reflective coating. As explained, these steps may be most easily performed by using an optically flat glass base and then coating it with a reflective coating, as fo rexample, chromium. One with a reflective coating, as for example, chromium. One sensitive coating; preferably the photosensitive coating is a plastic material, as for example, Kodak Photoresist material. After the reflective base is coated, it is exposed to the light that passes through both the information transparency and he halftone screen. As explained, while these steps are shown as being performed as separate operations, they obviously can be performed as a single operation. The information transparency may be exposed on the coating using any photographic technique, as for example a simple contact print may be made. Also, in place of the halftone screen other masks or transparencies may be used to create the irregular surface on the nonremoved portions of the coating. After the coated reflective member has been exposed to both the information transparency and the halftone screen, it is developed to remove the coating in the exposed areas. The development process also will remove a portion of the coating in the areas that are only exposed to the light that passes through the halftone screen. This partial removal will create the desired irregular surfaces.

From the above description it is seen that the present invention provides a reflection replica that can be used with the system described in the copending application with improved results. More particularly, the elimination of the unwanted light that is reflected from the coated areas of the replica will improve the contrast in the final seismic record. By selecting the halftone screen to provide diffracted light having a frequency beyond the frequency of the filter mask, no harm will be done to the processing of the seismic data. Since the frequency is beyond the frequency of the filter mask, the light diffracted from the coated areas will fall outside of the filtering mask and thus not be added or otherwise mixed with the valid signal information.

I claim as my invention:

1. A process for reducing reflection from opaque portions of residual photoresist coating on reflection replica used to form Fraunhofer defraction patterns of seismic data by reflection optics which comprise:
    coating a flat reflective surface with a photosensitive material;
    exposing the coated surface to light that passes through a diffusing screen and a transparent display of the information-containing pattern; and
    developing the photosensitive material so that the portion that remains is permeated by irregularities corresponding to the pattern of the diffusing screen.

2. The process of claim 1 wherein the photosensitive material comprises a plastic material that is changed in respect to its solubility in developer solutions by exposure to light.

3. The process of claim 1 in which the coated surface is first exposed to light that passes through a transparent display of the information-containing pattern and is then exposed to light that passes through a halftone screen.

4. The process of claim 3 wherein the halftone screen has a line fineness that will diffract the incident light used in the processing system outside the filter aperture used in the system.

5. The process of claim 3 wherein the halftone screen has a line fineness of at least 26.7 lines per millimeter.

References Cited

UNITED STATES PATENTS

| | | | |
|---|---|---|---|
| 3,374,141 | 3/1968 | Junge | 350—164 |
| 2,364,369 | 12/1944 | Jelley et al. | 350—164 |
| 3,438,643 | 4/1969 | Cook | 350—162 |

NORMAN G. TORCHIN, Primary Examiner

J. E. CALLAGHAN, Assistant Examiner

U.S. Cl. X.R.

96—38.3; 350—164